UNITED STATES PATENT OFFICE.

GUSTAV PLATNER, OF WITZENHAUSEN, GERMANY.

DEPOLARIZATION SUBSTANCE FOR ELECTRIC BATTERIES.

SPECIFICATION forming part of Letters Patent No. 630,071, dated August 1, 1899.

Application filed December 23, 1897. Serial No. 664,107. (No specimens.)

*To all whom it may concern:*

Be it known that I, GUSTAV PLATNER, physician, a subject of the King of Prussia, German Emperor, and a resident of Witzenhausen-on-the-Werra, in the Province of Hesse-Nassau, German Empire, have invented certain new and useful Improvements in Depolarization Substances for Electric Batteries, (for which I have obtained British Patent No. 23,329 of October 11, 1897,) of which the following is an exact specification.

This invention relates to improvements in depolarization substances for galvanic batteries, and has for its object the employment of chlorates for this purpose. Chlorates alone or uncombined are not suited for the above purpose, in view of the fact that they do not give forth their oxygen under the conditions existing in an electric battery. However, they will be especially suited for the object in question if certain other bodies are added to said chlorates, which bodies, in consequence of their chemical affinity, cause the chlorates to give off their oxygen. Chemical compounds, in the first place, suitable for the purpose in question—that is to say, compounds which by chemical combination cause oxygen to be given off—are, first, salts of iron—for instance, chlorid of iron and sulfate of iron—and, secondly, nearly all metallic salts which have the quality of readily passing over into basic compounds. For example, iron and chromium salts are easily transformed into basic salts. The reaction taking place in this case is of such a character that the acid radical or some atoms of the halogen become free by the action of the above-named compounds on the chlorates, which give off oxygen, and the hydroxyl group OH enters the compounds, and in this manner polarization is prevented. Hereby in many cases various additions are necessary which prevent the hydroxid possibly freed by the action of the components upon each other from attaching to the electrodes, causing probably the formation of double salts. I will proceed to give examples of a number of mixtures or compounds prepared according to this principle and serving for depolarization purposes.

First. If, for instance, an iron electrode is placed in a solution of chlorid of iron and chlorid of potassium, then protochlorid of iron is formed by the presence of the iron electrode, according to the formula:

$$Fe_2Cl_6 + Fe = 3FeCl_2.$$

The protochlorid thus formed enters into reaction with the chlorate, which latter transforms it into hydroxid of iron and chlorid of iron, according to the formula:

$$4FeCl_2 + 3O = Fe_2Cl_6 + Fe_2O_3 + 2Cl.$$

The free chlorin acts again on the water present, and the chlorid of iron is re-formed, as above explained, and will contain some basic chlorid of iron. The potential difference is in this case 0.95 volt. An addition of bichromate of potassium increases the tension to 1.2 volts, and the electrode remains free. A precipitate obtained by this mixture is then brought in solution with muriatic acid, whereby a small amount of the excess quantity of the latter can advantageously act, for the reason that chlorate treated with muriatic acid also disengages chlorin. A battery-cell of this description, when muriatic acid is added from time to time, will remain constant and serviceable and properly act for long periods.

Second. A zinc rod placed in any optional exciting liquid—such as, for instance, chlorid of zinc—to which liquid an addition of chlorate of potassium or of sodium and permanganate of potassium is made, gives a tension of 1.5 volts. The permanganate apparently undergoes hereby no change; but if chlorate were not present a precipitate of hydrate of manganese or peroxid would be immediately obtained, more especially at the electrodes.

Third. In a carbon cylinder a dry mixture of sulfate of iron, chlorate of potassium or sodium, and peroxid of manganese is tightly packed together. When placed with zinc in a solution of chlorid of ammonium, a tension of 1.8 to 1.9 volts is obtained. The sulfate of iron could be substituted by or for peroxid of lead. If two of the three components be mixed together, no noticeable action of one or the other takes place. If, however, all three are mixed together, a chemical reaction would at once take place. A basic iron or chromium salt would be formed. The sulfuric acid would decompose the chloric acid, which would at once separate to chlorin and oxygen. This action, however, takes place so gradually that the battery-cell would remain constant, as before mentioned, for a very long period.

Fourth. Tin-chlorid chlorammonium, (Sn Cl$_4$2NH$_4$Cl,) commonly called "pink salt," with chlorate of potassium, when employed as depolarization substance gradually expels its whole contents of chlorium, in which all the tin gradually goes over into hydroxid. The tension is 1.7 volts and very constant. Here it is true the salts of tin would penetrate the pores of a diaphragm, and the reduction of the duration in the constancy of the cell would not be avoidable for long periods together.

Having thus fully described the nature of this invention, what I desire to secure by Letters Patent of the United States is—

A depolarization substance for electric-battery cells, said substance being composed of chlorates combined with metallic salts capable of readily forming basic salts and disengaging acids or halogens, as set forth.

In testimony whereof I have signed this specification in the presence of two subscribing witnesses.

GUSTAV PLATNER.

Witnesses:
  HUGO NISSEN,
  WILLI PFLÄGING.